United States Patent
Nishimura et al.

(10) Patent No.: US 10,484,607 B2
(45) Date of Patent: Nov. 19, 2019

(54) SHAKE CORRECTION CONTROL DEVICE, SHAKE CORRECTION APPARATUS, AND IMAGE CAPTURE APPARATUS

(71) Applicants: Takeyoshi Nishimura, Kanagawa (JP); Naoto Asakura, Tokyo (JP)

(72) Inventors: Takeyoshi Nishimura, Kanagawa (JP); Naoto Asakura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 15/893,062

(22) Filed: Feb. 9, 2018

(65) Prior Publication Data

US 2018/0241926 A1 Aug. 23, 2018

(30) Foreign Application Priority Data

Feb. 20, 2017 (JP) ................. 2017-029404

(51) Int. Cl.
 *H04N 5/232* (2006.01)
 *G02B 27/64* (2006.01)
 *H04N 5/378* (2011.01)

(52) U.S. Cl.
 CPC ......... *H04N 5/2327* (2013.01); *G02B 27/646* (2013.01); *H04N 5/23245* (2013.01); *H04N 5/23248* (2013.01); *H04N 5/23258* (2013.01); *H04N 5/23287* (2013.01); *H04N 5/378* (2013.01)

(58) Field of Classification Search
 CPC .. H04N 5/2327; H04N 5/23258; H04N 5/378; H04N 5/23248; G02B 27/646
 See application file for complete search history.

(56) References Cited

U.S. PATENT DOCUMENTS

| | | |
|---|---|---|
| 2012/0086824 A1 | 4/2012 | Asakura et al. |
| 2014/0168481 A1 | 6/2014 | Nishimura |
| 2016/0094767 A1 | 3/2016 | Yamamoto |

FOREIGN PATENT DOCUMENTS

JP  2012-080506  4/2012

OTHER PUBLICATIONS

Extended European Search Report dated Jun. 22, 2018 in European Patent Application No. 18156132.5 citing documents AA and AB therein, 7 pages.

*Primary Examiner* — Twyler L Haskins
*Assistant Examiner* — Angel L Garces-Rivera
(74) *Attorney, Agent, or Firm* — Oblon, McClelland, Maier & Neustadt, L.L.P.

(57) ABSTRACT

A shake correction control device includes circuitry to control an ON/OFF timing of horizontal synchronizing signals of an image capture element, and an ON/OFF timing of one or more drive signals used for correcting a shake of the image capture element, shift at least one of the ON/OFF timing of the drive signals used for correcting the shake of the image capture element so as to be out of a period of time during which analog/digital (A/D) conversion processing is collectively performed on pixel signals for one or more horizontal lines of the image capture element, and adjust the at least one of the ON/OFF timing of the drive signals used for correcting the shake of the image capture element with respect to the horizontal synchronizing signals based on the number of the one or more horizontal lines of the pixel signals collectively subjected to the A/D conversion processing.

9 Claims, 6 Drawing Sheets

SHAKE CORRECTION CONTROL DEVICE, SHAKE CORRECTION APPARATUS, AND IMAGE CAPTURE APPARATUS

CROSS-REFERENCE TO RELATED APPLICATION

This application claims priority pursuant to 35 U.S.C. § 119(a) to Japanese Patent Application No. 2017-029404, filed on Feb. 20, 2017 in the Japan Patent Office, the disclosure of which is incorporated by reference herein in its entirety.

BACKGROUND

Technical Field

This disclosure relates to a shake correction control device, a shake correction apparatus, and an image capture apparatus.

Background Art

Typically, image capture apparatuses include an image capture element and a correction lens, and a shake correction device. When shaking of the image capture apparatus is detected, the shake correction device electromagnetically drives the image capture element and the correction lens to prevent occurrence of image blurring at the image capture element. Further, pixel signals generated by the image capture element are converted to digital signals by an analog/digital (A/D) converter, the digital signals are subjected to the image processing in a pixel processing system such as the digital pixel system (DPS: registered trademark), and then the processed signals are output to a display or a memory.

For example, conventional shake correction mechanism includes a movable stage mounted with a complementary metal-oxide semiconductor (CMOS) sensor integrated with a column A/D converter and a voice coil, and a stationary stage mounted with a permanent magnet, in which the movable stage is driven by an electromagnetic interaction between the voice coil disposed on the movable stage and the permanent magnet disposed on the stationary stage to offset the shaking of a camera.

In this configuration, noise occurs in the pixel signals transmitted from the A/D converter by receiving an effect of a magnetic field generated by the voice coil used for driving the movable stage. Since the voice coil is applied with pulse drive signals, the noise occurs when a greater potential change (i.e., magnetic field change) occurs such as when the pulse drive signal is rising (i.e., turning ON drive signal) and when the pulse drive signal is falling (i.e., turning OFF drive signal).

SUMMARY

In one aspect of the present invention, a shake correction control device is devised. The shake correction control device includes circuitry to control an ON timing and OFF timing of one or more horizontal synchronizing signals of an image capture element, and an ON timing and OFF timing of one or more drive signals used for correcting a shake of the image capture element, shift at least one of the ON timing and OFF timing of the one or more drive signals used for correcting the shake of the image capture element so as to be out of a period of time during which analog/digital (A/D) conversion processing is collectively performed on pixel signals for one or more horizontal lines of the image capture element, and adjust the at least one of the ON timing and OFF timing of the one or more drive signals used for correcting the shake of the image capture element with respect to the one or more horizontal synchronizing signals based on the number of the one or more horizontal lines of the pixel signals collectively subjected to the A/D conversion processing.

BRIEF DESCRIPTION OF DRAWING

A more complete appreciation of the description and many of the attendant advantages and features thereof can be readily obtained and understood from the following detailed description with reference to the accompanying drawings, wherein.

Figure 1A:
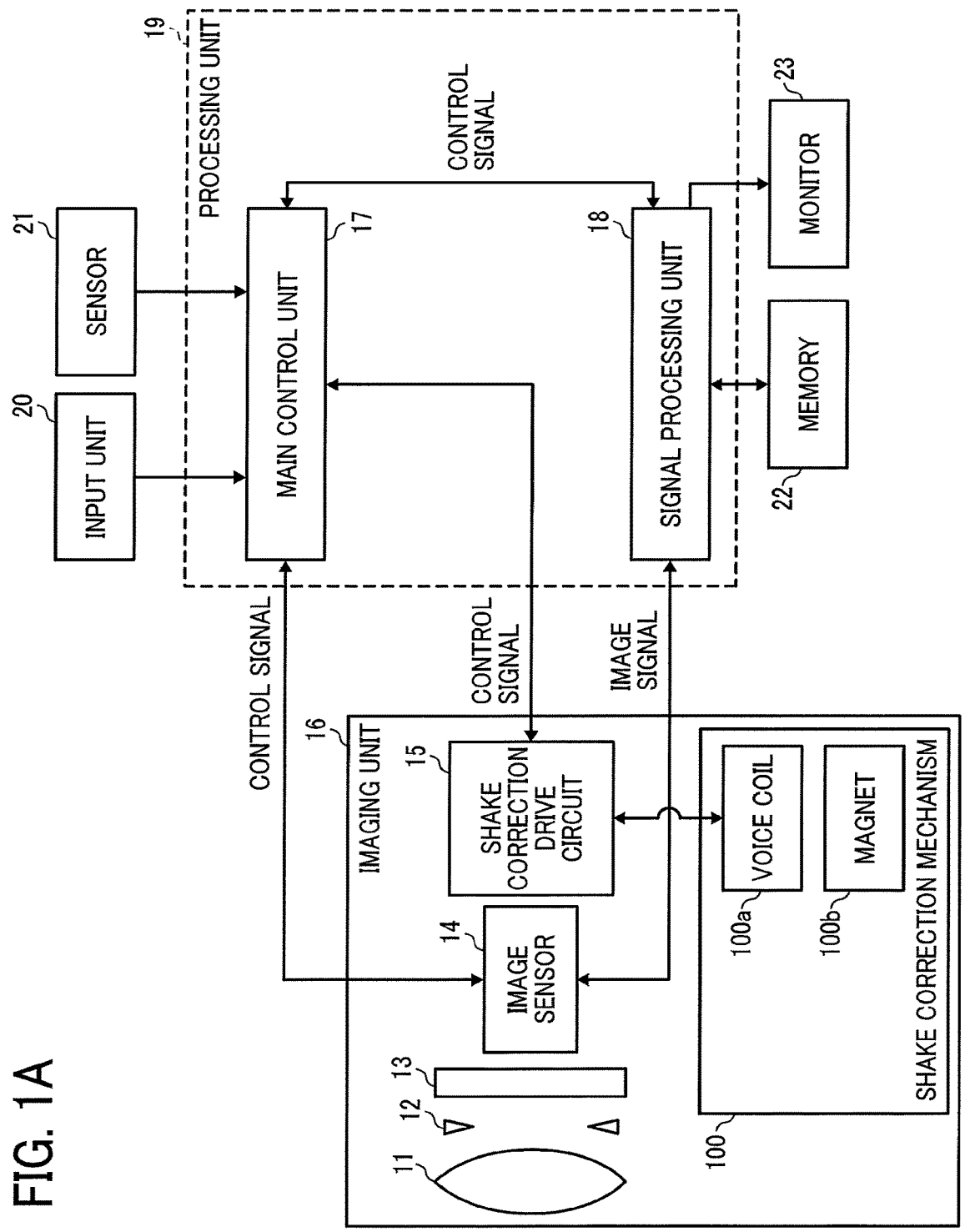
FIG. 1A illustrates an example of a block diagram of an image capture apparatus mounted with a shake correction control device according to a first embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present invention with reference to the drawings. FIG. 1A illustrates an example of a block diagram of an image capture apparatus 10 mounted with a shake correction control device or shake correction drive signal control device according to a first embodiment of the present invention.

In the first embodiment, the image capture apparatus 10 is, for example, a digital camera including an image capture element such as a complementary metal-oxide semiconductor (CMOS) image sensor. As illustrated in FIG. 1A, the image capture apparatus 10 includes, for example, an imaging unit 16 and a processing unit 19. The imaging unit 16 includes, for example, an imaging lens 11, an aperture 12, a mechanical shutter 13, an image sensor 14 (i.e., image capture element), a shake correction drive circuit 15, and a shake correction mechanism 100 while the processing unit 19 includes, for example, a main control unit 17 and a signal processing unit 18. Further, an input unit 20 and a sensor 21 are connected to the main control unit 17 while a memory 22 and a monitor 23 are connected to the signal processing unit 18. In this disclosure, at least the imaging unit 16, the processing unit 19 and the sensor 21 configure a shake correction apparatus.

Figure 1B:
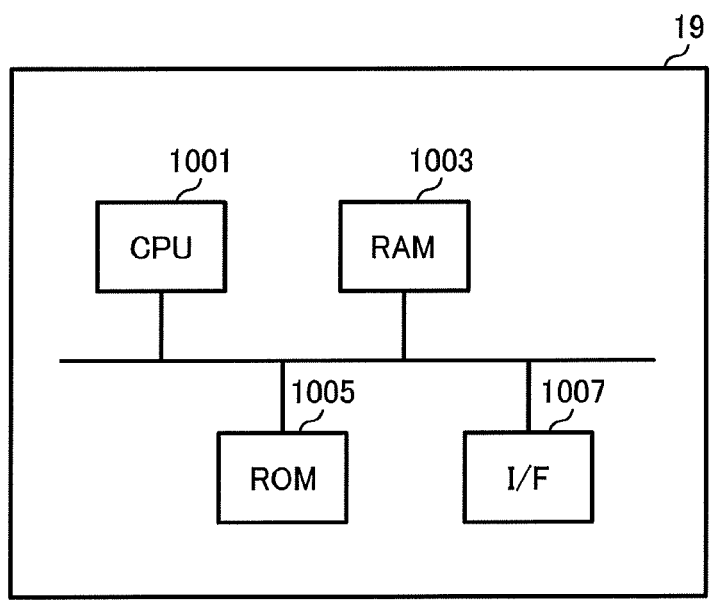
FIG. 1B illustrates an example of a hardware block diagram of a computing unit of the image capture apparatus of FIG. 1A.

FIG. 1B illustrates an example of a hardware block diagram of the processing unit 19. As illustrated in FIG. 1B, the processing unit 19 includes, for example, a central processing unit (CPU) 1001, a read-only memory (ROM) 1005, a random access memory (RAM) 1003, and an interface (I/f) 1007, and the functions of the processing unit 19 are implemented when the CPU 1001 executes programs stored in the ROM 1005 in cooperation with the RAM 1003, but not limited thereto. For example, at least a part of the processing unit 19 can be implemented by a dedicated hardware circuit such as a semiconductor integrated circuit. The program executed by the processing unit 19 may be configured to be provided by being recorded in a computer-readable recording medium, storage medium or carrier medium such as a compact disk read only memory (CD-ROM), a flexible disk (FD), a compact disk recordable (CD-R), a digital versatile disk (DVD), and a universal serial bus (USB) memory as a file of an installable format or an executable format. Alternatively, the program may be configured to be provided or distributed through a network such as the Internet. Moreover, various programs may be configured to be provided by being pre-installed into a non-volatile recording medium such as ROM 1005.

In this configuration, the image sensor 14 is driven by a control signal such as a horizontal synchronizing signal and a vertical synchronizing signal received from the main control unit 17.

Further, when an image is captured by the image sensor 14 through the imaging lens 11, the aperture 12, and the mechanical shutter 13, the image sensor 14 transmits an image signal of the captured image to the signal processing unit 18, and then the image signal is subjected to the image processing in the signal processing unit 18. For example, when the image sensor 14 is being driven with a live view mode, image signals output from the image sensor 14 are processed by the signal processing unit 18, and then displayed as a movie image on the monitor 23. Further, when a release switch of the input unit 20 is operated during the live view mode, the image sensor 14 is driven with a still image shooting mode, in which the image signals output from the image sensor 14 are processed by the signal processing unit 18, and then stored in a nonvolatile memory such as the memory 22 (e.g., memory card).

The main control unit 17 outputs a control signal to the image sensor 14, and also outputs a control signal to the shake correction drive circuit 15. For example, in this disclosure, the image capture apparatus 10 includes the shake correction mechanism 100 including a fixed base, and a movable base mounting the image sensor 14. The shake correction mechanism 100 is used for adjusting a position of the image sensor 14 based on a signal related to the yaw axis, a signal related to the pitch axis, and a signal related to the roll axis of the image capture apparatus 10 transmitted from the sensor 21 such as an angular acceleration sensor and an acceleration sensor to cancel or offset the shaking of the image capture apparatus 10, which may be caused by a motion of a user or the like that handles the image capture apparatus 10 by hand or the like.

In this configuration, when the shaking occurs, the main control unit 17 receives one or more signals output from the sensor 21, calculates a positional shift amount of the image sensor 14 that is required to cancel the shaking, and outputs a control signal for instructing a shift of the position of the image sensor 14 to the shake correction drive circuit 15. For example, as illustrated in FIG. 1A, the movable base is mounted with a plurality of voice coils 100a arranged with a given arrangement pitch, in which one or more pulse drive signals is applied to the voice coils 100a from the shake correction drive circuit 15 while the control signal is supplied to the shake correction drive circuit 15.

As illustrated in FIG. 1A, the fixed base is mounted with a plurality of magnets 100b respectively facing the plurality of voice coils 100a mounted on the movable base, with which a position of the movable base can be shifted so as to cancel an effect of the shaking by using an electromagnetic interaction between the voice coils 100a disposed on the moveable base and the magnets 100b disposed on the fixed base. The information of the position of the movable base is fed back to the main control unit 17 to calculate the positional shift amount of the moveable base, and in the embodiment, the voice coils 100a mounted on the moveable base and the magnets 100b mounted on the fixed base may be collectively configured in the shake correction mechanism 100.

Further, the control signal transmitted to the shake correction drive circuit 15 also includes a horizontal synchronizing signal to be transmitted to the image sensor 14, and the horizontal synchronizing signal is used to control the output timing of a pulse drive signal, which is to be described later.

Figure 2:
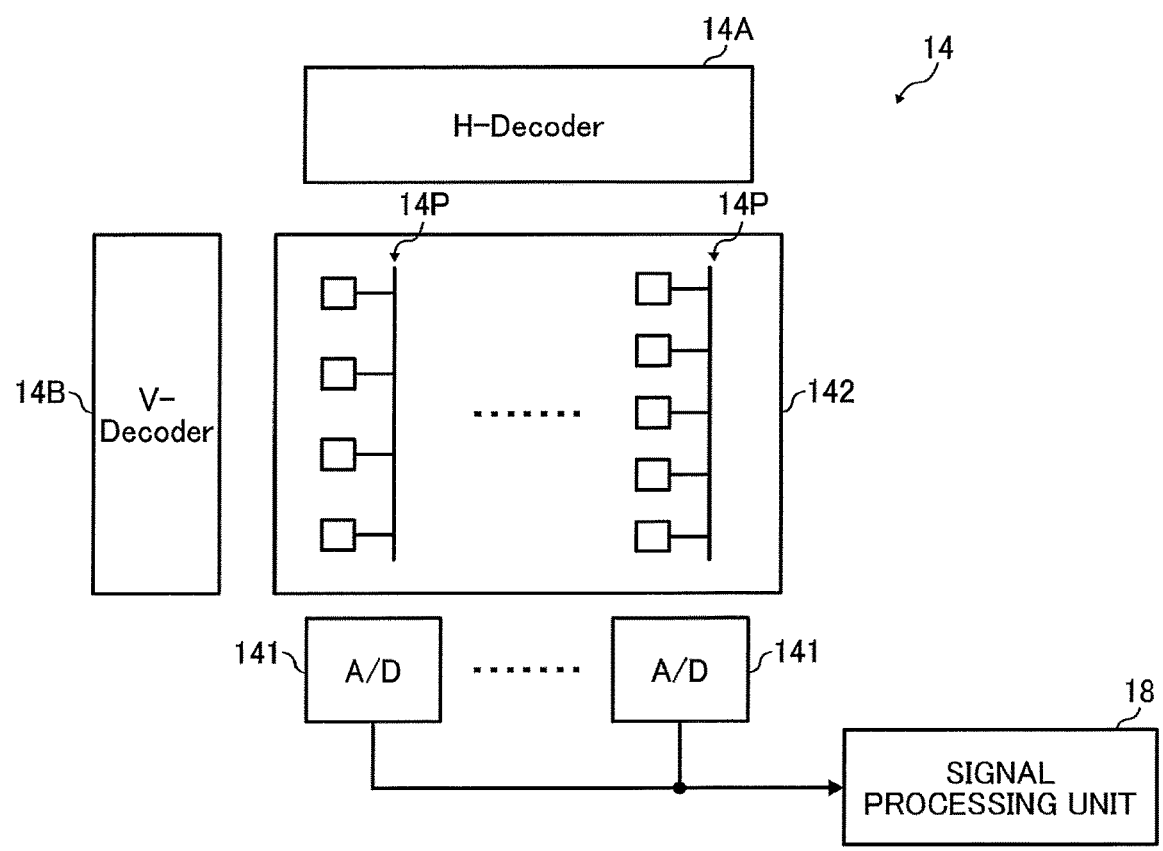
FIG. 2 illustrates a schematic configuration of an image sensor using a complementary metal-oxide semiconductor (CMOS) sensor as an example an image sensor.

FIG. 2 illustrates a schematic configuration of the image sensor 14 employing a complementary metal-oxide semiconductor (CMOS) sensor as an example of the image sensor 14. Hereinafter, the image sensor 14 may be also referred to as the CMOS sensor 14.

As illustrated in FIG. 2, the CMOS sensor 14 is an image sensor that integrally includes, for example, a column analog/digital (A/D) converter 141, a light-receiving face 142 having a plurality of pixel rows 14P formed thereon, a horizontal shift register 14A (H-decoder), and a vertical shift register 14B (V-decoder), in which the column A/D converter 141 is arranged adjacent to one end of the pixel row 14P within a proximity range. In this configuration, when light enters the light-receiving face 142, a pixel signal is generated on each pixel formed on the light-receiving face 142 of the CMOS sensor 14. Then, the pixel signals are sequentially read out by the horizontal shift register 14A and the vertical shift registers 14B for each one of the horizontal lines. The read pixel signals are subjected to A/D conversion processing in the column A/D converter 141 by setting one or more horizontal lines as a unit of the A/D conversion processing. For example, one or more analog image signals (i.e., pixel signals) output from the image capture element such as the CMOS sensor 14 are converted to one or more digital image signals by performing the analog/digital (A/D) conversion processing. In the first embodiment, the A/D conversion processing is performed for a plurality of horizontal lines one-by-one or collectively, which can be switched by selecting a drive mode of the image sensor 14. For example, when the still image shooting mode is being used, the A/D conversion processing is performed for the horizontal lines one by one, and when the live view mode is being used, the A/D conversion processing is collectively performed for the plurality of horizontal lines such as for every two horizontal lines.

Figure 3:
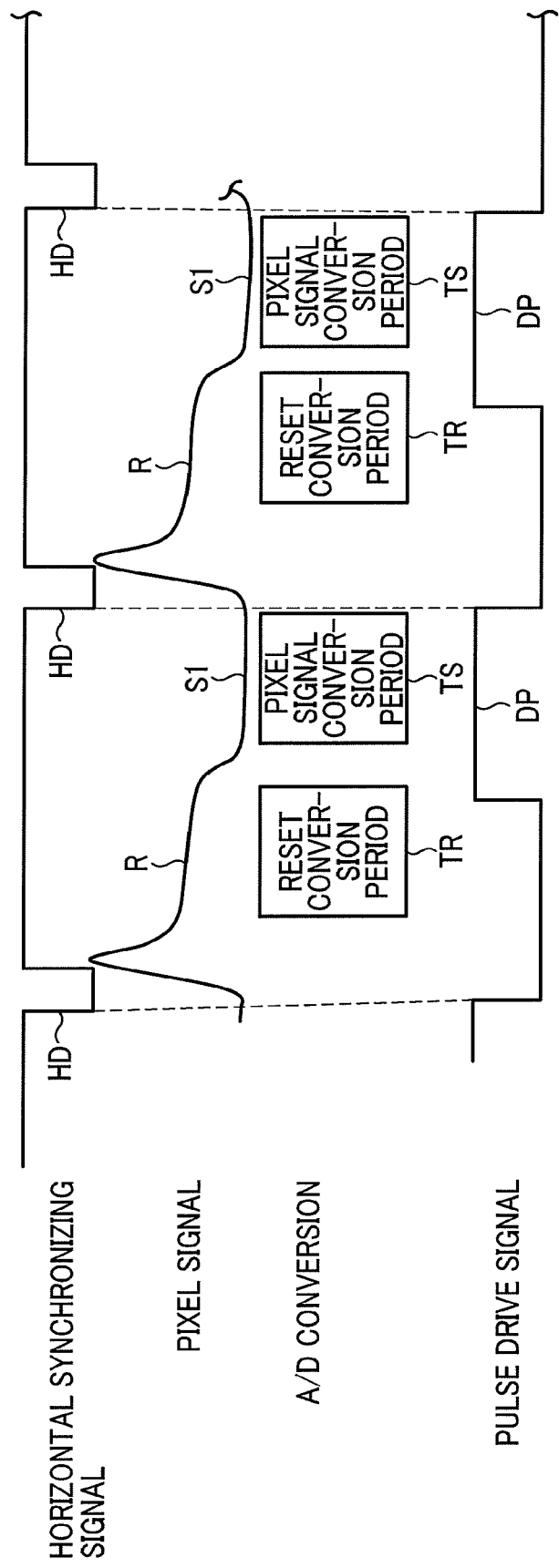
FIG. 3 illustrates an example of a timing chart of a horizontal synchronizing signal, a pixel signal, an A/D conversion processing, and a shake correction drive signal during a still image shooting mode of the first embodiment.

FIG. 3 illustrates an example of a timing chart of a horizontal synchronizing signal, a pixel signal, an A/D conversion processing, and a shake correction drive signal when the still image shooting mode is being applied, in which the A/D conversion processing is performed for the horizontal lines one by one. The shake correction drive signal is a pulse drive signal used for correcting the shaking of the image capture element 14.

As illustrated in FIG. 3, each of the horizontal synchronizing signals is output from the main control unit 17 to the image sensor 14 by setting a given constant cycle. As illustrated in FIG. 3, a pixel signal S1 of one horizontal line segment is sequentially output from the image sensor 14 between two horizontal synchronizing signals HD, in which one horizontal line segment is defined by the falling edges of the two adjacent horizontal synchronizing signals HD, and the pixel signal S1 for each of the pixel row 14P is transmitted to the column A/D converter 141.

In each of the column A/D converters 141, the pixel signal S1 of the one horizontal line segment, which is read during the most-recent horizontal synchronization period, is subjected to the A/D conversion processing at a given timing synchronized with the currently-outputting horizontal synchronizing signal HD. The most-recent horizontal synchronization period is a period just before the currently horizontal synchronization period that is outputting the currently-outputting horizontal synchronizing signal HD. More specifically, when the currently-outputting horizontal synchronizing signal HD is being output, a reset signal R output in the most-recent horizontal synchronization period is sampled in each of the A/D converters 141, and then the pixel signal S1 of the one horizontal line segment read out in the most-recent horizontal synchronization period is sampled in each of the A/D converters 141. FIG. 3 illustrates a reset signal conversion period TR for performing the A/D conversion processing to the reset signal R, and a pixel signal conversion period TS for performing the A/D conversion processing to the pixel signal S1, in which the correlated double sampling (CDS) is performed.

As illustrated in FIG. 3, the reset signal conversion period TR starts at a given time point by setting an interval from a time point of the falling of the horizontal synchronizing signal HD of the most-recent horizontal synchronization period. When the reset conversion period TR ends, the pixel signal conversion period TS starts at a given time point by setting an interval from an end time point of the reset conversion period TR. The A/D conversion processing in the pixel signal conversion period TS ends before the next horizontal synchronizing signal HD is output, with which one pixel signal conversion period TS ends.

By contrast, a pulse drive signal DP output from the shake correction drive circuit 15 is output to the voice coils 100a of the shake correction mechanism 100 at a given time period such that at least one of the rising (i.e., turning ON) and falling (i.e., turning OFF) of the pulse drive signal DP does not overlap the A/D signal processing period performed by the column A/D converter 141, which means the pulse drive signal DP is output from the shake correction drive circuit 15 such that at least one of the rising (i.e., turning ON) and falling (i.e., turning OFF) of the pulse drive signal does not overlap the reset signal conversion period TR and the pixel signal conversion period TS. In the first embodiment, it is designed that the pixel signal conversion period TS ends before the next horizontal synchronizing signal HD is output, and the falling edge of the pulse drive signal DP is synchronized with the falling edge of the current horizontal synchronizing signal HD so that the falling edge of the pulse drive signal DP does not overlap with the pixel signal conversion period TS. In the first embodiment, the timing of rising (i.e., turning ON) the pulse drive signal DP is adjusted in accordance with a control signal transmitted from the main control unit 17, in which the control signal instructs a positional shift amount of the movable base.

Figure 4:
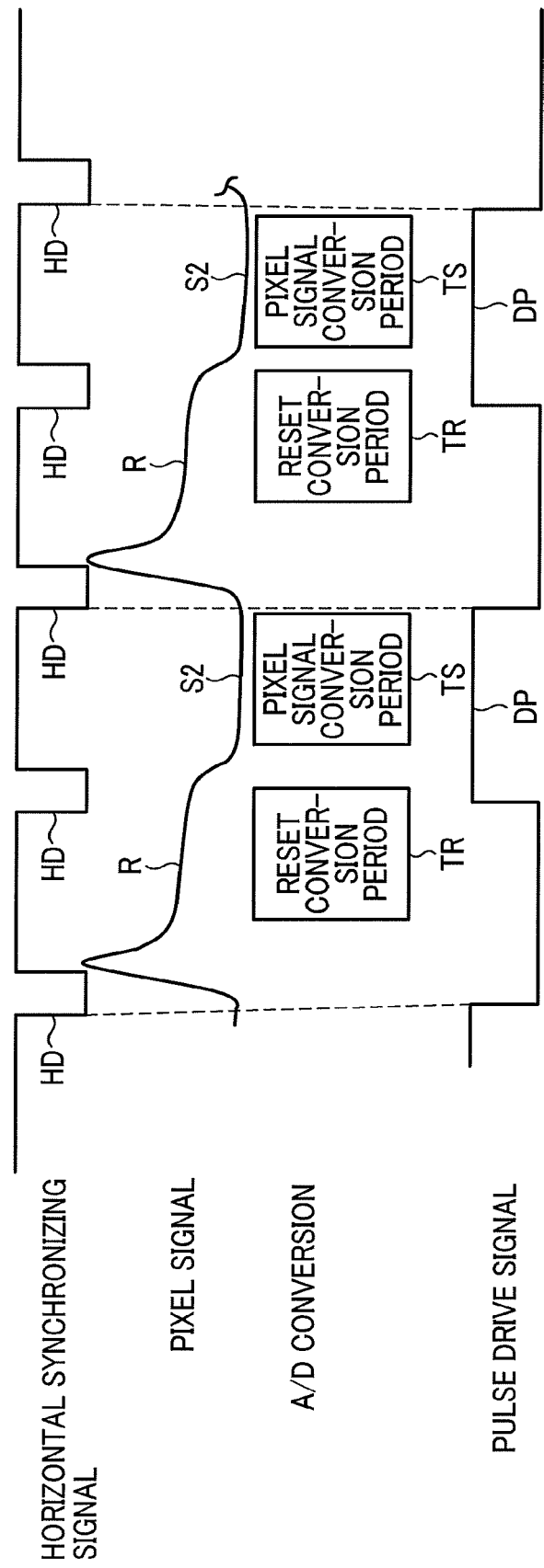
FIG. 4 illustrates an example of another timing chart of a horizontal synchronizing signal, a pixel signal, an A/D conversion processing, and a shake correction drive signal during a live view mode of the first embodiment.

FIG. 4 illustrates an example of another timing chart of a horizontal synchronizing signal, a pixel signal, an A/D conversion processing, and a shake correction drive signal when the live view mode is applied, in which the A/D conversion processing is performed for every two horizontal lines collectively. The shake correction drive signal is a pulse drive signal used for correcting the shaking of the image capture element 14.

Similar to the still image shooting mode, each of the horizontal synchronizing signals is output from the main control unit 17 to the image sensor 14 by setting a given constant cycle as illustrated in FIG. 4. As illustrated in FIG. 4, as to the image sensor 14, a pixel signal S2 of two horizontal line segments is sequentially output from each of the pixel rows 14P in a period defined by the falling edges of the three horizontal synchronizing signals HD, and the pixel signal S2 for each of the pixel row 14P is transmitted to the column A/D converter 141. In each of the column A/D converters 141, the pixel signal S2 of the two horizontal line segments, which is read out during the most-recent horizontal synchronization period, is subjected to the A/D conversion processing at a given timing synchronized with the currently-outputting horizontal synchronizing signal HD. More specifically, the reset signal R output in the most-recent two horizontal synchronization periods is sampled in each of the A/D converters 141, and then the pixel signal S2 of the two horizontal line segments read out in the most-recent two horizontal synchronization periods is sampled in each of the A/D converters 141. Similar to FIG. 3, FIG. 4 illustrates the reset signal conversion period TR for performing the A/D conversion processing to the reset signal R, and the pixel signal conversion period TS for performing the A/D conversion processing to the pixel signal S2, in which the correlated double sampling (CDS) is performed.

As illustrated in FIG. 4, the reset signal conversion period TR starts at a given time point by setting an interval from a time point of the falling of the first horizontal synchronizing signal HD, and when the reset conversion period TR ends, the pixel signal conversion period TS starts at a given time point by setting an interval from an end time point of the reset conversion period TR. The A/D conversion processing in the pixel signal conversion period TS ends before the third horizontal synchronizing signal HD is output, with which one pixel signal conversion period TS ends.

Further, the pulse drive signal DP output from the shake correction drive circuit 15 is output to the voice coils 100a of the shake correction mechanism 100 at a given time period such that at least one of the rising (i.e., turning ON) and falling (i.e., turning OFF) of the pulse drive signal DP does not overlap with the A/D signal processing period performed by the column A/D converter 141, which means the pulse drive signal DP is output from the shake correction drive circuit 15 such that at least one of the rising (i.e., turning ON) and falling (i.e., turning OFF) of the pulse drive signal DP does not overlap with the reset signal conversion period TR and the pixel signal conversion period TS. In the first embodiment, it is designed that the pixel signal conversion period TS ends before the third horizontal synchronizing signal HD is output, and the falling edge of the pulse drive signal DP is synchronized with the falling edge of the third horizontal synchronizing signal HD so that the falling edge of the pulse drive signal DP does not overlap with the pixel signal conversion period TS.

As described above, in the first embodiment, when the A/D conversion processing is performed for the plurality of horizontal lines by setting one horizontal line as the unit of the A/D conversion processing, or when the A/D conversion processing is performed for the plurality of horizontal lines by setting a plurality of horizontal lines (e.g., two or more horizontal lines) as the unit of the A/D conversion processing, noise that may occur in a pixel signal by applying the pulse drive signal used for the shake correction processing can be reduced. With this configuration, even when the A/D conversion processing is performed under the different drive modes by setting different number of horizontal lines as the unit of the A/D conversion processing, the drive modes can be switched while maintaining the noise reduction effect.

Hereinafter, a description is given of an output control (i.e., drive mode) of a pulse drive signal by the shake correction drive circuit 15 according to a second embodiment with reference to FIG. 5. The second embodiment is same as the first embodiment except for a configuration related to the output control of the pulse drive signal. Therefore, the same reference numerals and signs are used for the same configurations in the second embodiment and the first embodiment, and the description thereof is omitted.

Further, the output control of the pulse drive signal of the second embodiment can be applied as another drive mode such as a drive transition mode in addition to the control of the live view mode described in the first embodiment. The drive transition mode is a drive mode that is applied to the image sensor 14 when the live view mode is switched to the still image shooting mode, or when transiting from an auto focus (AF) data acquisition mode to the live view mode or the still image mode.

In the live view mode of the first embodiment, the A/D conversion processing is performed by setting the two horizontal line segments as the unit of the A/D conversion processing, in which each of the horizontal synchronizing signals is output by setting a given constant cycle as illustrated in FIG. 4. By contrast, in the drive mode of the second embodiment, the A/D conversion processing is performed by setting the two horizontal line segments as the unit of the A/D conversion processing while the cycle of the horizontal synchronizing signals is variably set for each of the horizontal synchronizing signals.

Figure 5:
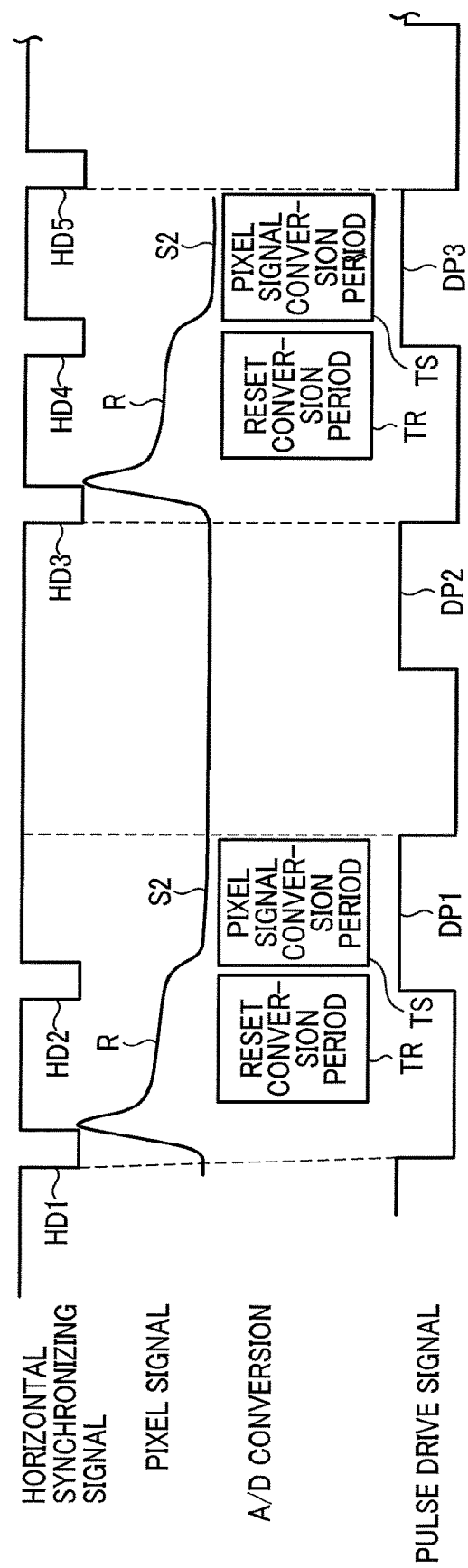
FIG. 5 illustrates an example of a timing chart of a horizontal synchronizing signal, a pixel signal, an A/D conversion processing, and a shake correction drive signal during a live view mode when a drive mode of a second embodiment is applied.

In an example illustrated in FIG. 5, a first horizontal synchronizing signal HD1 and a second horizontal synchronizing signal HD2 are output by setting the same given cycle while a third horizontal synchronizing signal HD 3 is output by setting a different cycle such as the three times of the given cycle of the first horizontal synchronizing signals HD1 and HD2, in which the third horizontal synchronizing signal HD 3 is used as the first signal for outputting the next pixel signal. Thereafter, a fourth horizontal synchronizing signal HD 4 and a fifth horizontal synchronizing signal HD 5, respectively corresponding to the second signal and the third signal for outputting the next pixel signal, are output by setting the same given cycle of the first horizontal synchronizing signals HD1 and HD2.

In an example illustrated in FIG. 5, the pixel signal S2 of the two horizontal line segments is sequentially output from the image sensor 14 during a period of outputting the three horizontal synchronizing signals (e.g., HD1 to HD3, HD3 to HD5), and then the pixel signal S2 of the two horizontal line segments is subjected to the A/D conversion processing. In this configuration, the pixel signal S2 of the first-time two horizontal line segments is output and then subjected to the A/D conversion processing while the horizontal synchronizing signals HD1 to HD3 are output, and then the pixel signal S2 of the next-time two horizontal line segments is output and then subjected to the A/D conversion processing while the horizontal line signal HD3 to HD5 are output.

In this example case, the outputting of each pixel signal from the image sensor 14, and the reset signal conversion (TR) and the pixel signal conversion (TS) in each of the column A/D converter 141 are executed with respect to the preceding horizontal synchronizing signal (i.e., HD1, HD3) at a timing similar to the timing of the live view mode of the first embodiment. Further, the pulse drive signal DP 1 transits to the lower level (i.e., pulse drive signal DP1 is turned OFF) at a time point after a given time elapses from the input of the horizontal synchronizing signal HD2 and then the input of the horizontal synchronizing signal HD3 is detected, in which the pulse drive signal DP 1 transits to the lower level (i.e., pulse drive signal DP1 is turned OFF) at a timing that can optimize the shake correction control.

By contrast, the pulse drive signal DP2 and the pulse drive signal DP3 transits to the lower level (i.e., pulse drive signal DP2 and DP3 are turned OFF) at a time point of detecting the third horizontal synchronizing signal (e.g., HD3, HD5) with respect to the outputting of the pixel signal S2 of the two horizontal line segments. In this configuration, the shake correction drive circuit 15 includes, for example, a counter that counts the number of horizontal synchronizing signals, and transits the pulse drive signals DP2 and the DP3 to the lower level (i.e., pulse drive signals DP2 and DP3 are turned OFF) when a count value of horizontal lines becomes the number of collectively-processable horizontal lines.

The shake correction drive circuit 15 further includes a function of detecting and controlling the interval (i.e., cycle/frequency) between the horizontal synchronizing signals HD in addition to the counter function, and outputs one or more drive pulses that are required within the period of the horizontal synchronizing signal HD. For example, the timing of rising of the pulse drive signals DP2 and DP3 (i.e., pulse drive signals DP2 and DP3 are turned ON) can be adjusted by using this function.

As described above, even when the A/D conversion processing is performed by setting the plurality of horizontal lines as the unit of the A/D conversion processing, noise that may occur in a pixel signal by applying the pulse drive signal used for the shake correction processing can be reduced by applying the control method of the second embodiment. With this configuration, even when the A/D conversion processing is performed by setting different number of horizontal lines as the unit of the A/D conversion processing when the different drive modes are used, the noise reduction effect can be maintained even when the drive modes are switched.

Further, in the second embodiment, even when the cycle of the horizontal synchronizing signals is not the same, the A/D conversion processing can be performed by setting the plurality of horizontal lines as the unit of the A/D conversion processing.

Further, since the outputting of the pulse drive signal (i.e., turning OFF of pulse drive signal) is controlled by using the counter function that counts the number of the horizontal synchronizing signals, the rising and falling of the pulse drive signal can be more effectively deviated from the A/D conversion processing compared to a case that the outputting of the pulse drive signal (i.e., turning OFF of pulse drive signal) is controlled based on the time interval of the horizontal synchronizing signals, with which the noise reduction can be performed more effectively.

In the second embodiment, the falling of the pulse drive signal (i.e., turning OFF of pulse drive signal) is synchronized with the horizontal synchronizing signal, but not limited thereto. For example, the rising of the pulse drive signal (i.e., turning ON of pulse drive signal) can be synchronized with the horizontal synchronizing signal to obtain the same effect. For example, the rising of the pulse drive signal (i.e., turning ON of pulse drive signal) can be synchronized with the first horizontal synchronizing signal related to the outputting of the pixel signal and the A/D conversion of the pixel signal.

Further, in the above described first and second embodiments, the pixel signal of one horizontal line segment is read from the image capture element or the pixel signals of two horizontal line segments are collectively read from the image capture element, and then the pixel signal is subjected to the A/D conversion processing.

However, the above described first and second embodiments can be also applied to a case when three horizontal lines or more are collectively processed. For example, when "m" horizontal lines (m: positive integer) are collectively processed and the horizontal synchronizing signals are being output with the given same cycle, the ON timing and the OFF timing of the pulse drive signal can be synchronized with each time point that is calculated by multiplying the given constant cycle with the number of "m." Further, when the horizontal synchronizing signals are not output with the same given cycle (i.e. when the horizontal synchronizing signals are output by setting various cycles), the ON timing and the OFF timing of the pulse drive signal can be synchronized with every time point when the counted number of the horizontal synchronizing signals becomes the number of "m."

Further, the configuration of the shake correction mechanism and the configuration of the image capture element are not limited to the above described embodiments, but the control method of the above described embodiments can be applied to any configurations that the pulse drive signal used for the shake correction mechanism affects the pixel signal. Further, the image capture apparatus can be any type of devices such as digital cameras, camera-mounted smart phones equipped with the above described image capture element and the shake correction mechanism. Further, although the still image shooting mode and the live view mode are described as examples of the switchable drive modes in the first embodiment, the switchable drive modes are not limited to thereto. For example, the switching between the two drive modes in the first embodiment can be a switching between the still image shooting mode and the AF mode, or between the AF mode and the live view mode.

As to the above described embodiments of the present invention, the shake correction control device, configured by the shake correction drive circuit 15 and the main control unit 17, includes circuitry to control an ON timing and OFF timing of one or more horizontal synchronizing signals of an image capture element 14, and an ON timing and OFF timing of one or more drive signals used for correcting a shake of the image capture element 14, shift at least one of the ON timing and OFF timing of the one or more drive signals used for correcting the shake of the image capture element 14 so as to be out of a period of time during which the analog/digital (A/D) conversion processing is collectively performed on pixel signals for one or more horizontal lines of the image capture element 14, and adjust the at least one of the ON timing and OFF timing of the one or more drive signals used for correcting the shake of the image capture element 14 with respect to the one or more horizontal synchronizing signals based on the number of the one or more horizontal lines of the pixel signals collectively subjected to the A/D conversion processing, in which noise caused by a shake correction drive signal can be reduced even when the pixel signals are processed by setting a plurality of horizontal lines as the unit of the A/D conversion processing of the pixel signal.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations of the above embodiments and the variant examples are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

What is claimed is:

1. A shake correction control device comprising:
circuitry to
control an ON timing and OFF timing of one or more horizontal synchronizing signals of an image capture element, and an ON timing and OFF timing of one or more drive signals used for correcting a shake of the image capture element;

shift at least one of the ON timing and OFF timing of the one or more drive signals used for correcting the shake of the image capture element to be out of a period of time during which analog/digital (A/D) conversion processing is collectively performed on pixel signals for a plurality of horizontal lines of the image capture element; and adjust the at least one of the ON timing and OFF timing of the one or more drive signals used for correcting the shake of the image capture element with respect to the one or more horizontal synchronizing signals based on a number of horizontal lines of the plurality of horizontal lines of the pixel signals collectively subjected to the A/D conversion processing, wherein at least one of the ON timing and OFF timing of the one or more drive signals is located within a reset conversion time period after shifting.

2. The shake correction control device of claim 1, wherein the circuitry outputs the one or more drive signals by setting a cycle corresponding to a number obtained by multiplying the number of the plurality of horizontal lines of the pixel signals, collectively subjected to the A/D conversion processing, with a cycle of the horizontal synchronizing signals.

3. The shake correction control device of claim 1, wherein the circuitry counts a number of the one or more horizontal synchronizing signals, and synchronizes any one of the ON timing and the OFF timing of the one or more drive signals used for correcting the shake of the image capture element with the one or more horizontal synchronizing signals based on the counted number of the one or more horizontal synchronizing signals.

4. The shake correction control device of claim 1, wherein the circuitry changes the number of the plurality of horizontal lines collectively subjected to the A/D conversion processing depending on a drive mode of the image capture element.

5. The shake correction control device of claim 4, wherein the drive mode includes a mode for capturing a movie image and another mode for capturing a still image.

6. A shake correction apparatus comprising:
the shake correction control device of claim 1; and
a sensor to detect a motion of the image capture element.

7. The shake correction apparatus of claim 6, further comprising a mechanism to adjust a position of the image capture element based on the one or more drive signals.

8. An image capture apparatus comprising:
the shake correction apparatus of claim 6; and
circuitry to
set a drive mode of the image capture element,
convert one or more analog image signals output from the image capture element to one or more digital image signals by performing the analog/digital (A/D) conversion processing, and
output the one or more digital image signals to any one of a monitor and a storage medium.

9. The shake correction control device of claim 1, wherein the one or more drive signals are active-low signals.

* * * * *